United States Patent [19]

Shimizu

[11] Patent Number: 5,796,991
[45] Date of Patent: Aug. 18, 1998

[54] IMAGE SYNTHESIS AND DISPLAY APPARATUS AND SIMULATION SYSTEM USING SAME

[75] Inventor: Seiya Shimizu, Kawasaki, Japan

[73] Assignee: Fujitsu Limited, Kawasaki, Japan

[21] Appl. No.: 974,557

[22] Filed: Nov. 19, 1997

Related U.S. Application Data

[63] Continuation of Ser. No. 432,273, May 1, 1995, abandoned.

[30] Foreign Application Priority Data

May 16, 1994 [JP] Japan .................. 6-101214

[51] Int. Cl.$^6$ .................................................. G06F 9/455
[52] U.S. Cl. ............................................................. 395/500
[58] Field of Search ............................. 395/500; 364/578

[56] References Cited

U.S. PATENT DOCUMENTS

| | | | |
|---|---|---|---|
| 4,730,260 | 3/1988 | Mori et al. | 395/135 |
| 4,731,864 | 3/1988 | Modla | 382/255 |
| 4,845,641 | 7/1989 | Ninomiya et al. | 395/135 |
| 4,970,666 | 11/1990 | Welsh et al. | 395/123 |
| 5,325,470 | 6/1994 | Sumino et al. | 395/121 |
| 5,510,832 | 4/1996 | Garcia | 348/56 |

FOREIGN PATENT DOCUMENTS 5-127851  5/1993  Japan .

*Primary Examiner*—Kevin J. Teska
*Assistant Examiner*—Ayni Mohamed
*Attorney, Agent, or Firm*—Staas & Halsey

[57] ABSTRACT

An image synthesis and display apparatus. The apparatus includes a display device, an image pickup device, an extraction unit and a synthesis unit. The display device displays a simulation image to a user, and provides a field of view of the simulation image to the user. The image pickup device detects an image of a range of an actual space corresponding to the field of view provided to the user by the display device. The extraction unit extracts an image of an object from the image detected by the image pickup device. The synthesis unit inserts the image extracted by the extraction unit into a simulation of a virtual space, to produce the simulation image displayed by the display device. The image pickup device is aligned with the display device, and the image pickup device and the display device move with the user while maintaining the alignment between the image pickup device and the display device.

13 Claims, 12 Drawing Sheets

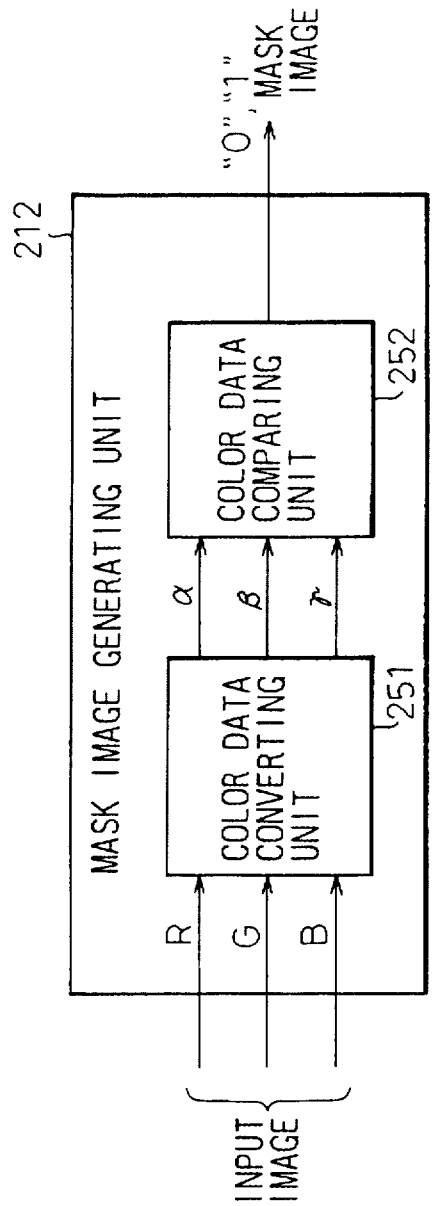

IMAGE SYNTHESIS AND DISPLAY APPARATUS AND SIMULATION SYSTEM USING SAME

This application is a continuation of application Ser. No. 08/432,273, filed May 1, 1995, now abandoned.

BACKGROUND OF THE INVENTION

1. Field of the Invention

The present invention relates to an image synthesis and display apparatus which combines a real-time image picked up by a camera or the like with a computer graphics (CG) image or other video image, and more specifically it relates to an image synthesis and display apparatus which is used as a display device for a head-mounted display, which is mounted on the head of a user and displays an image on a display unit that is positioned directly in front of the user's eye.

In recent years, virtual reality systems, which synthesize and display CG images in response to the movements of and operations by the user, have gained attention, and are being used in the field of simulation of the interiors of buildings and the inside equipment of vehicles.

In such applications, with the desire to enhance the sense of presence, the head-mounted display is gaining attention for use as a display device. The reason for this is that it is possible to easily achieve a 360-degree field of view by changing the image displayed by the head-mounted display in response to movement of the user.

In addition, in the above-noted field, to enhance the sense of presence on the part of the user, it is desired to store, for example, part of the interior of a building or vehicle beforehand, and to match this to the case in which the user touches an actually existing object. To achieve this type of sensory simulator, the technology to perform synthesis of a real-time image corresponding to what the user would see in the field of view with virtual images, such as CG images, is necessary.

2. Description of the Related Art

A see-through type head-mounted display apparatus, such as described below with reference to the accompanying figures, is a known technology of simultaneously displaying external, real-time images in the user's field of view and CG or other video images.

In this see-through type head-mounted display apparatus, when a shutter is opened, the incident light from the outside environment is optically synthesized, using a half-mirror, with the light from an image display unit, making it possible to provide the user with an image which is the superimposition of the image from the outside environment received through a lens and the image displayed on the image display unit.

Examples of sensory simulation systems include interior simulators which simulate the interior of either a building or a vehicle, and a car driving simulator.

In an interior simulator of the past, the position and acceleration of the hand of the user, to which is fixed a glove-type sensor, are measured, an image generating and processing unit generating and displaying, in response to the results of this measurement, computer graphics which show the shape of the room and the layout of the furniture, or the like, based on information from an internal database, thereby giving the user a virtual experience of interior of the room.

In this type of simulator, the image presented to the user is represented entirely by computer graphics, including the hand of the user and the objects that the user touches.

In the motion simulator for a vehicle, a model of a vehicle, including control equipment such as a steering wheel, is placed in front of a screen, the image displayed on the above-noted screen being changed in response to commands input from the user via the control equipment, thereby giving the user a virtual experience of driving a vehicle on a virtual road.

In doing this, an image processing unit of the motion simulator first estimates the change in position caused by the motion of the vehicle, based on commands from the control equipment, and then generates computer graphics of the surrounding view, based on these predicted values and the road information stored in a database, these being displayed on the above-noted screen.

In the motion simulator there is an image database into which are stored video movie images which have been created beforehand. These images are retrieved from this database based on the results of the estimation of the vehicle position and displayed.

A see-through type head-mounted display apparatus as described above is devised in order to simultaneously present to the user images from the surrounding environment and computer graphics, and since it merely provides an optical overlaying of images from the surrounding environment with computer graphics, it was not capable of exclusive selection of either the images from the surrounding environment or the virtual computer graphics. Thus, a problem with its simple application to a sensory simulator is that objects in the background which should be hidden behind other objects show through the object behind which they are positioned, this preventing the use of this method in presenting to the user an image which provides a high sense of presence.

In the case of interior simulators, when the images presented to the user are entirely generated as computer graphics, if all the information such as the positions of actually existing objects is input, it is possible to display actually existing objects with the proper positional relationship to virtual objects. However, it is difficult to input all of this information, and to generate computer graphics in real time based on this information, since an enormous amount of computing capability is required, making it extremely unrealistic.

In conventional cases, such as in motion simulators, in which images of objects such as models which the user can touch are combined with virtual images projected onto a screen, if, for example, the surroundings of the model are entirely surrounded by a screen, because it is possible to achieve a 360-degree field of vision, it is possible to provide the user with a high sense of presence. However, the scale of the motion simulator in this case becomes quite large.

SUMMARY OF THE INVENTION

In consideration of the above-described problems in the prior art, the present invention has as an object to provide an image synthesis and display apparatus which synthesizes and displays the images of actually existing objects, so that they have a natural appearance, among images of virtual objects.

To attain the above-noted object, the present invention is an image synthesis and display apparatus having a display means which is positioned just in front of the user's eye, an image pickup means which picks up images of the view of the space surrounding the user which are to be presented to the user, an extraction means which extracts an image of an indicated object from the images picked up by the image pickup means, and a synthesis means which exclusively inserts an image extracted by the extraction means into the simulation image which presents a virtual space and which generates the thus synthesized image.

BRIEF DESCRIPTION OF THE DRAWINGS

The above-noted object and features of the present invention will be more apparent from the following description of the preferred embodiments, with reference being made to the accompanying drawings, which are as follows.

FIG. 9 is a block diagram which shows an example of a mask image generating unit.

DESCRIPTION OF THE PREFERRED EMBODIMENT

Before describing the embodiments of the present invention, the related art and the disadvantages therein will be described, with reference made to the related accompanying drawings.

Figure 11:
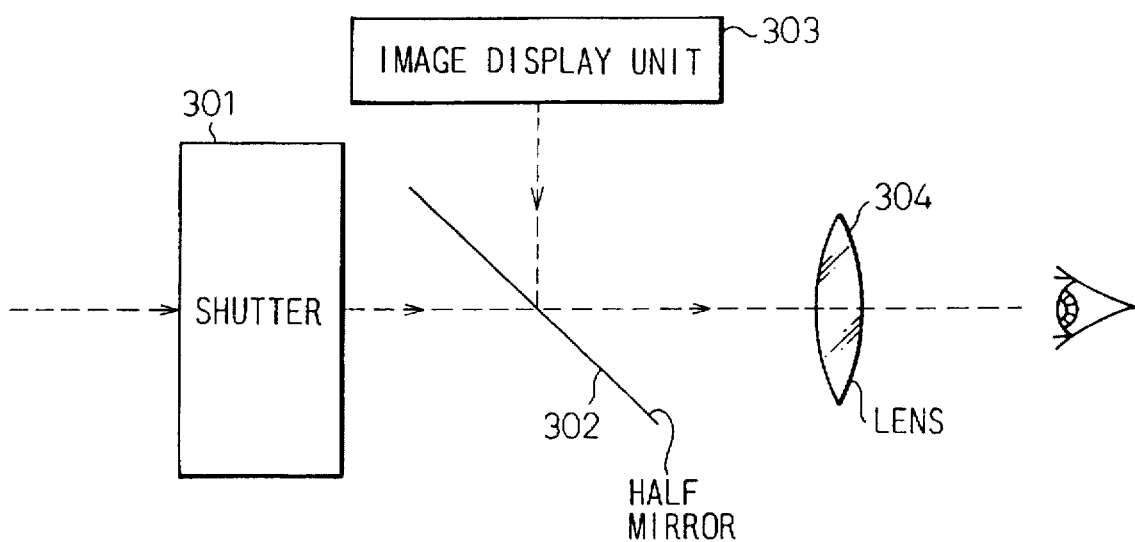
FIG. 11 is a block diagram which shows an example of a mask image generating unit.

FIG. 11 shows a see-through type head-mounted display apparatus of the type described above. As shown in this drawing, in this see-through type head-mounted display apparatus, when a shutter 301 is open, light is received from the outside surroundings, and a half-mirror 302 causes optical synthesis of this light with light from the image display unit 303. Therefore, the user has available an image which is the image of the outside surroundings through the lens 304 overlaid with the image displayed on the image display unit 303.

However, as described above, a see-through type head-mounted display apparatus as described above is devised in order to simultaneously present to the user images from the surrounding environment and computer graphics, and since it merely provides an optical overlaying of images from the surrounding environment with computer graphics, it was not capable of exclusive selection of either the images from the surrounding environment or the virtual computer graphics.

Thus, a problem with its simple application to a sensory simulator is that objects in the background which should be hidden behind other objects show through the object behind which they are positioned, thereby preventing the use of this method in presenting to the user an image which provides a high sense of presence.

Figure 1:
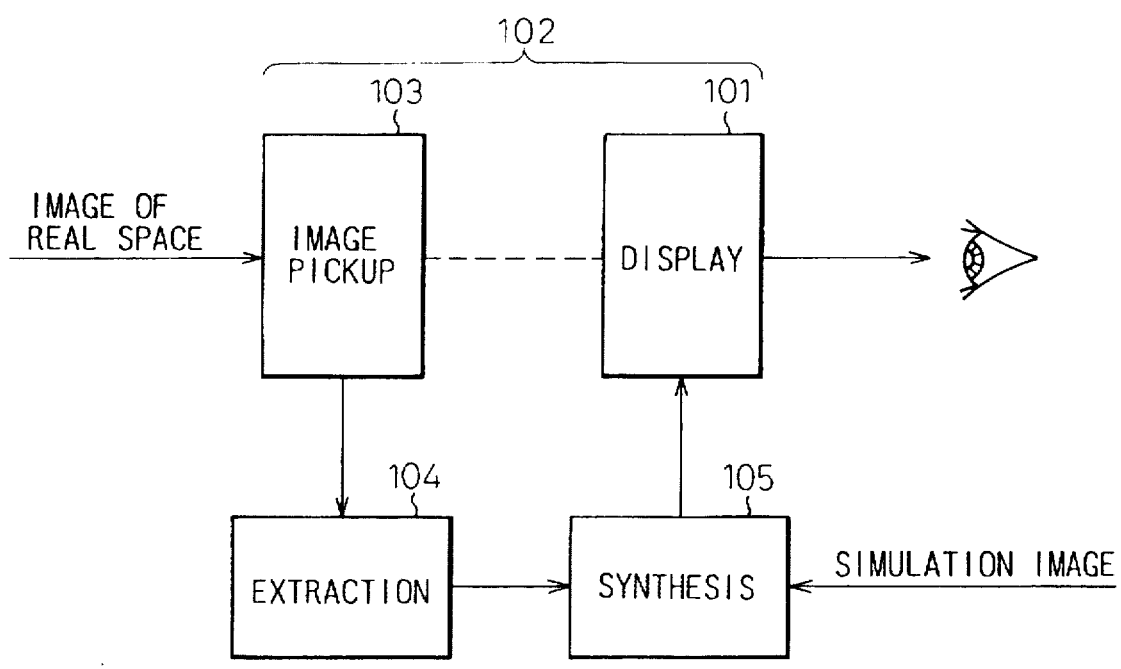
FIG. 1 is a block diagram which illustrates the principle of an image synthesis and display apparatus according to the present invention.

FIG. 1 is a block diagram which illustrates the principle of an image synthesis and display apparatus according to the present invention.

The apparatus shown in this drawing has a display means 101 which is positioned just in front of the user's eye, an image pickup means 103 which picks up images of the view of the space surrounding the user which are to be presented to the user by the display means 101, an extraction means 104 which extracts an image of an indicated object from the images picked up by the image pickup means 103, and a synthesis means 105 which exclusively inserts an image extracted by the extraction means 104 into the simulation image which presents a virtual space and which displays the thus synthesized image.

Figure 2:
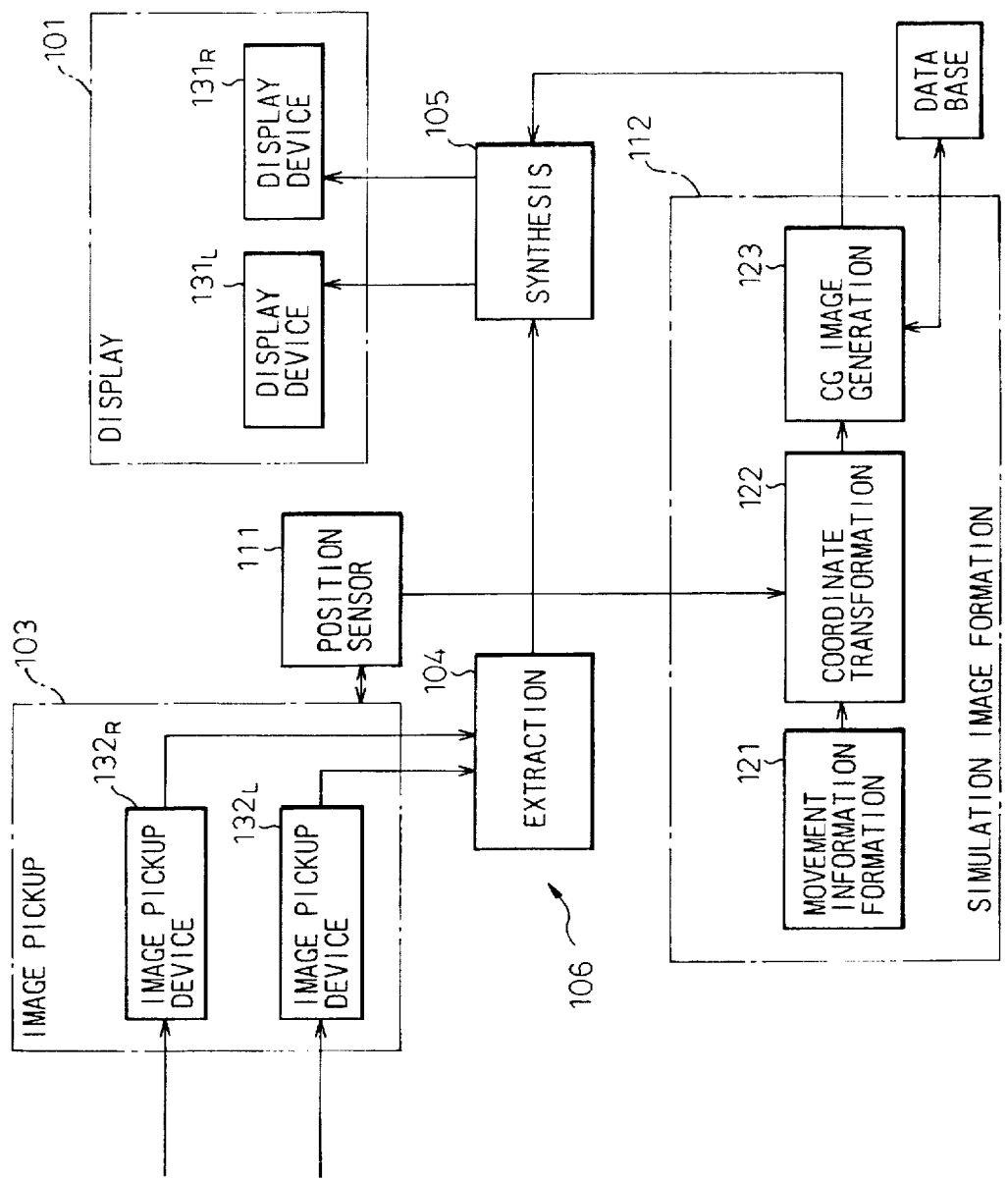
FIG. 2 is a block diagram which illustrates the principle of a simulation system according to the present invention.

FIG. 2 is a block diagram which illustrates the principle of a simulation system according to the present invention.

The simulation system shown in this drawing has an image synthesis and display apparatus 106 which has an image pickup means 103 which picks up images of the actually existing space corresponding to the field of view presented to the user by the display means 101, an extraction means 104 which extracts an image of an indicated object from the images picked up by the image pickup means 103, and a synthesis means 105 which exclusively inserts an image extracted by the extraction means 104 into the simulation image which represents a virtual space. It also has a position sensor 111 which measures the position and the direction of the light axis in the actual space of the image pickup means 103, and a simulation image forming means 112 which forms a simulation image of an object in the virtual space, based on the position and view orientation within the virtual space that corresponds to the position and light axis direction obtained by the position sensor 111, and which sends this to the synthesis means 105.

In the simulation system shown in FIG. 2, the simulation image forming means 112 has a movement information forming means 121 which forms virtual movement information related to the movement of the virtual position of the user in the virtual space, a coordinate transforming means 122 which transforms the position and light axis direction obtained by the position sensor 111, based on the virtual movement information, to a position and view orientation in the virtual space, and a computer graphics (CG) image generating means 123 which generates the computer graphics (CG) with a projection reference point and a normal direction to the picture plane from the position and view orientation, respectively, obtained from the coordinate transforming means 122.

In the simulation system shown in FIG. 2, a display means 101 has a two display devices 131L and 131R which independently display the images for the left eye and right eye, respectively, of the user, and the image pickup means 103 has two image pickup devices 132L and 132R which pickup images over a range corresponding to the field of view to be presented to the left eye and the right eye, respectively, of the user. The extraction means 104 is constructed so as to perform independent extraction processing of the images obtained by the two image pickup devices 132L and 132R, and the simulation image forming means 112 forms simulation images for the left eye and the right eye of the user based on the position and view orientation of the left and right eyes in virtual space, which correspond to the position and a light axes obtained by the position sensor 111. The synthesis means 105 synthesizes the simulations which correspond to the right eye and left eye with the results of extraction, with respect to the images obtained by the image pickup devices 132L and 132R, respectively, and provide these for display on the two display devices 131L and 131R.

By virtue of the above-described constitution, referring to FIG. 1, the extraction means 104 extracts the required part from the image obtained by means of the image pickup means 103, and the synthesis means 105 performs exclusive synthesis of this with the simulation image. Because the image obtained by the image pickup means 103 corresponds to the field of view presented to the user, the position occupied by an extracted object in the overall image corresponds to the position occupied by the corresponding object in the user's field of view. Thus, by means of the above-noted synthesis processing, it is possible to insert an object into the simulation image while maintaining its positional relationship such that it is as if the user were actually viewing the object, thereby maintaining a natural impression of the object in a synthesized display which includes both a virtual object and actual objects.

In the apparatus shown in FIG. 2, the position sensor 111 measures the position of the image pickup means 103 of the image synthesis and display apparatus 106, the simulation image forming means 112 forming a simulation image based on the results of this measurement, thereby enabling a synthesized display of the simulation image and an actual image in response to the motion of the user.

In the simulation system which is shown in FIG. 2, the coordinate transforming means 122 transforms the position and light axis direction of the image pickup means 103 to a position and view orientation in the virtual space, based on the virtual movement information obtained by the movement information forming means 121, thereby enabling the computer graphics generating means 123 to generate a simulation image which takes into consideration not only the movement of the user in actual space, but also virtual movement. By doing this, in a driving simulator which simulates the driving of a vehicle in a virtual space, it is possible to display both actually existing objects such as the steering wheel, and the user's arms and legs, and objects in the virtual space as seen through windows in a natural manner, thereby providing an environment with a high sense of presence.

In addition, in the simulation system which is shown in FIG. 2, by the position of the two image pickup devices 132L and 132R of the image pickup means 103, it is possible to obtain images of two actual spaces which exhibit binocular parallax and, by means of the simulation image forming means 112, it is possible to obtain two simulation images which exhibit binocular parallax. Thus, the extraction means 104 extracts the required portions from the above-noted two actual spaces and the synthesis means 105 inserts these into the corresponding simulation images, the thus obtained images being independently displayed on the display devices 131L and 131R of the display means 101, thereby enabling a stereoscopic representation by means of a synthesized image which includes virtual and real objects.

Next, the embodiments of the present invention will be described in detail, with reference being made to the accompanying drawings.

Figure 3:
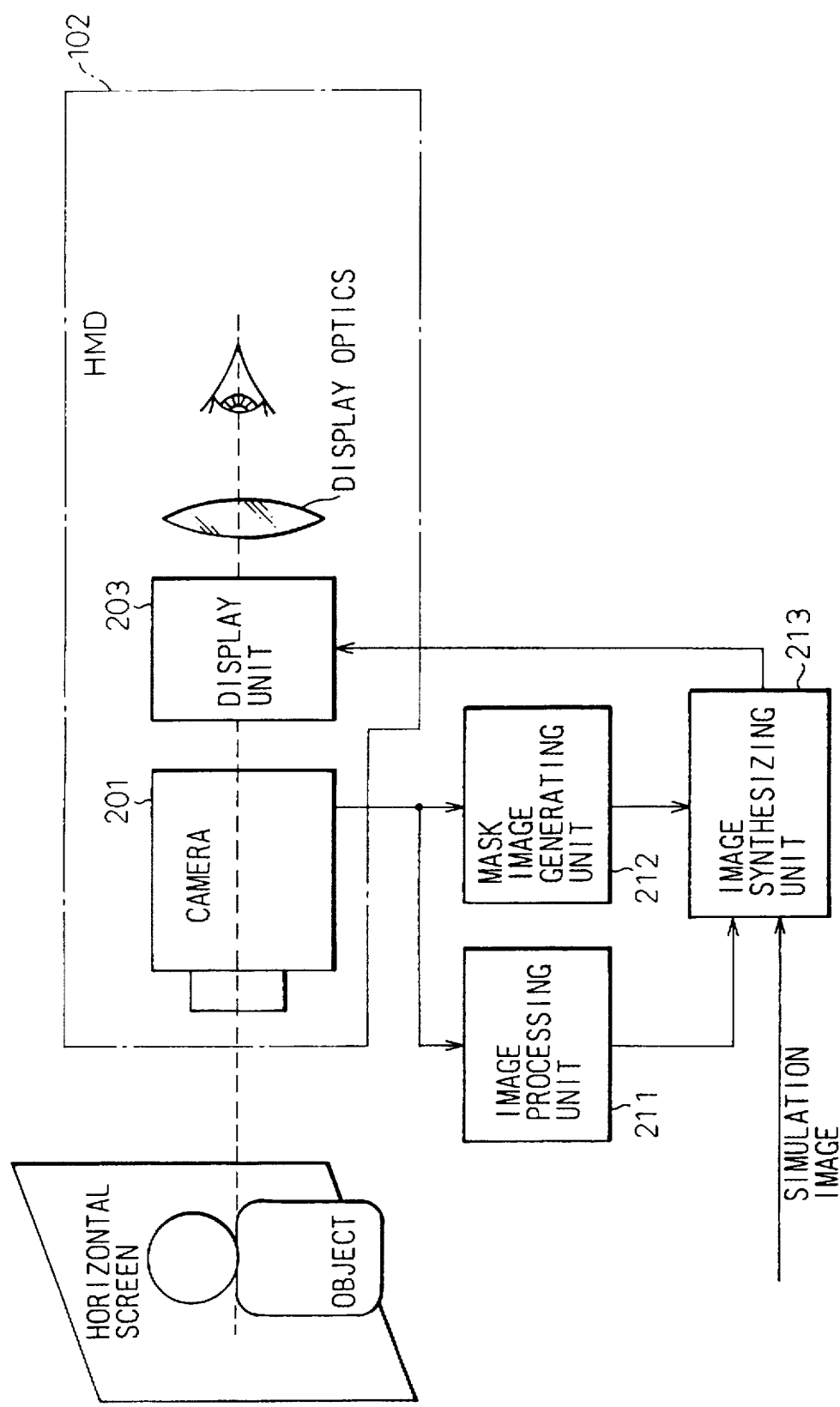
FIG. 3 is a block diagram which shows the constitution of an embodiment of an image synthesis and display apparatus according to the present invention.

FIG. 3 shows the block diagram of an example of an image synthesis and display apparatus according to the present invention.

In FIG. 3, the camera 201 which corresponds to the image pickup means 103 and the display unit 203 which corresponds to the display optics and display means 101 provided on a head-mounted display (HMD) 102 have their light axes positioned so as be aligned with the view orientation of the user. The direction of light incident to the camera 201 and the direction of the light emanating from the above-noted display unit 203 is opposite to that of the view orientation of the user.

With this arrangement, with the camera 201 fixed in proximity to the display unit 203 of the head-mounted display 102, if the angular field of view of the camera 201 is set-up to coincide with the angular field of view of the head-mounted display 102 as seen from the user, it is possible to obtain an image from the camera 201 that has an angular field of view that is similar to the user's angular field of view.

Under these conditions, if the image picked up by the camera 102 is displayed on the display unit 203, the user can view this display unit 203 to obtain a view that is approximately the same as if the user viewing the actual space directly. That is, the displayed position of an object picked up by the camera 201 approximately coincides with the position in which the object would appear if the user were to view it directly.

The image obtained by the above-described camera 201 is sent to an image processing unit 211 and the mask image generating unit 212. In the image processing unit 211, processing such as gradation conversion (gradation processing) is performed for the purpose of display on the head-mounted display 102.

The mask image generating unit 212 distinguishes between an object and its background, based on the input image, and generates a mask image based on the results of this processing. The processing of the distinguishing by the mask image generating unit 212 can be realized by utilizing a chromakey technique. For example, as shown in FIG. 3, if a blue horizontal screen is placed behind an object, the mask image generating unit 212 can determine whether or not a pixel belongs to the object or to the background by determining whether or not the pixel is blue, which is the color of the horizontal screen. In doing this, the mask image generating unit 212 can, for example, set a pixel of the mask image which corresponds to the object to a logic value of "1" and set a pixel which corresponds to the background to a logic value of "0."

The image synthesizing unit 213 is configured so as to perform synthesis of the output of the above-described image processing unit 211 and the externally input image, based on the mask image obtained as described above. In doing this, the image synthesizing unit 213 refers to the value of each of the pixels of the mask image, and if a pixel has a logical value of "1" the image data corresponding to a pixel of the actual image obtained from the image processing unit 211 (hereinafter referred to as the real image) is selected. If the pixel, however, has a logical value of "0" the image data corresponding to a pixel of the externally input image is selected, the selected pixel in either case being sent to the head-mounted display.

Thus, based on the mask image which is obtained by the mask image generating unit 212 as described above, the image synthesizing unit 213 operates so as to implement the functions of the extraction means 104 and the synthesis means 105, to thereby enable generation of a synthesized image which is synthesized from the required portion of the real image and the externally input image.

Because the real image obtained by the camera 201 as described above corresponds to the field of view of the user and also the real image is exclusively synthesized with the externally input image by means of the image synthesizing unit 213, by displaying the synthesized image obtained as described above on the display unit 203 of the head-mounted display 102, it is possible to provided the user with the impression that an object existing in the real space exists in the virtual space which is represented by the externally input image.

Because the processing performed in the above-described mask image generating unit 212 and image synthesizing unit 213 is extremely simple compared with the processing for generating all the images in the form of computer graphics, it is possible to perform real-time processing sufficiently using a relatively small-scale computer.

In the image synthesis and display apparatus according to the present invention as described above, because it is possible to synthesize the picture which represents a real object with a virtual picture so as to produce a natural impression, if an image obtained from simulation processing is input as the externally input image (this being hereinafter called a simulation image), it is possible to achieve a simulation system producing sensory simulation that has a high sense of presence.

The following is a description of an embodiment of a simulation system according to the present invention.

Figure 4:
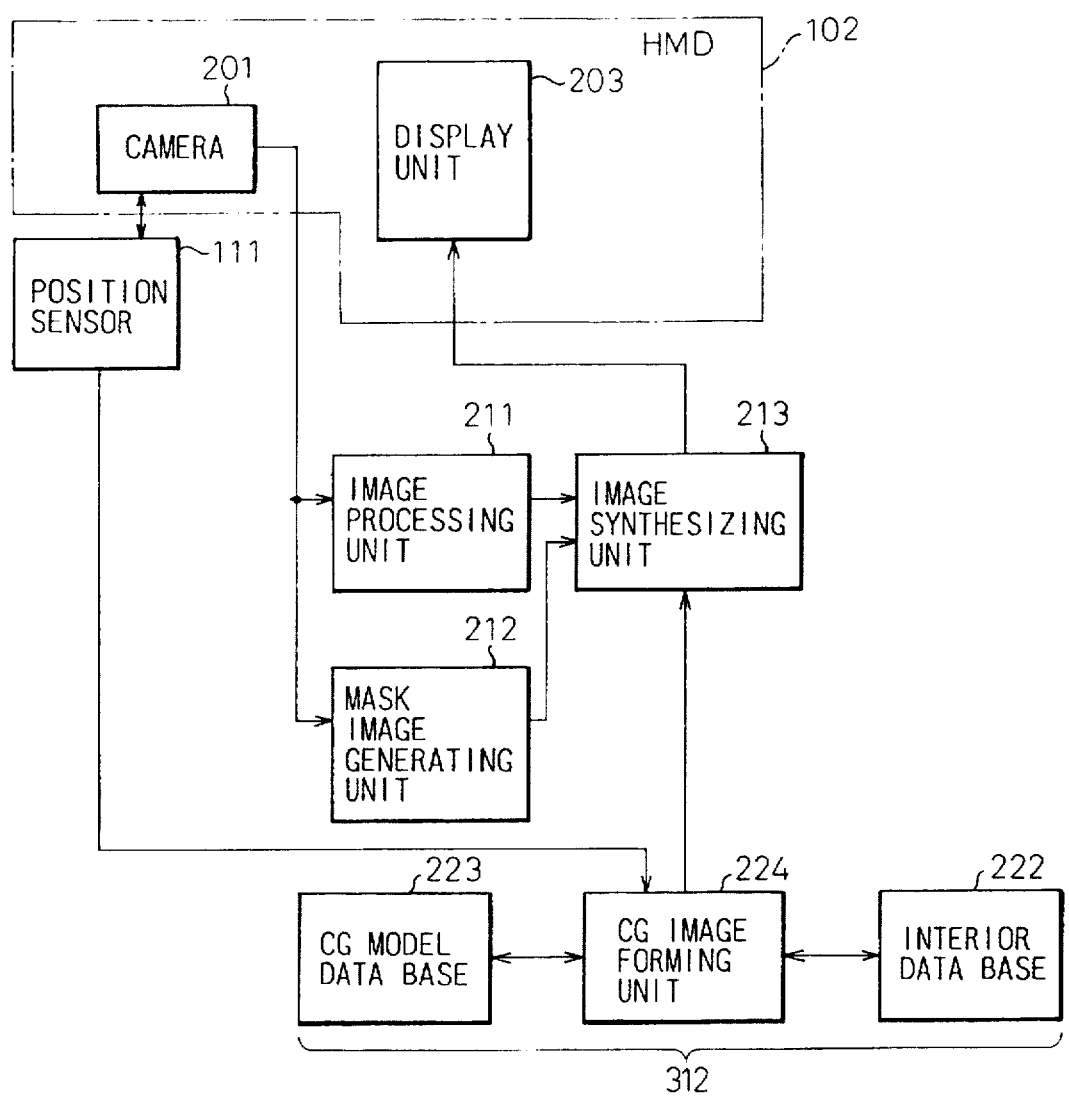
FIG. 4 is a block diagram which shows the constitution of a simulation system according to the present invention.

FIG. 4 shows the above-noted simulation system.

In FIG. 4, the simulation system is the image synthesis and display apparatus which is shown in FIG. 3, with the addition of a position sensor 111 which measures the position and light axis direction of the camera 201, and a simulation image generating means 312, which comprises an interior database 222, a computer graphics (CG) model database 223 and a computer graphics (CG) image forming unit 224.

This simulation system is a system which places objects such as chairs, tables, and kitchen units in the studio into a virtual model of a room interior, for the purpose of verifying the design matching thereof.

If a correspondence is established between the coordinate system of the virtual room interior (hereinafter referred to as the room interior coordinate system) and the real coordinate system in the studio, it is possible to obtain directly from the position sensor 111 the coordinates and light axis direction which express the position of camera 201 in the room interior coordinate system. It is possible to implement this position sensor 111 using an ultrasonic position sensor or magnetic position sensor.

To simplify the explanation which follows, the processing performed to form a simulation image will be described below, with the limiting condition that the movement of the camera position due to the movement of the user is limited to a parallel translation movement pan P, which is indicated as an angle of rotation about an axis which is parallel to the Z axis and as tilt with respect to the XY plane, in the above-described room interior coordinate system.

In FIG. 4, the room interior database 222 has stored in it layout information related to, for example, furniture within the room, and the computer graphics (CG) model database 223 has stored in it computer graphics models which reproduce the shapes, textures, and colors of walls, floors, furniture and the like.

In this case, the computer graphics (CG) image forming unit 224 searches the required computer graphics in the computer graphics model database 223, based on the shape of the room and layout of the furniture indicated by the interior information stored in the interior database 222 and, taking the coordinates (X, Y, Z) of the camera 201 as the projection reference point, the light axis direction (P, T) represented as a pan P and a tilt T is taken as the normal direction to the projection plane for the formation of the computer graphics image of the above-described computer graphics models.

The computer graphics image obtained in this manner is sent to the above-described image synthesizing unit 213 of the image synthesis and display apparatus as the simulation image, and synthesized with the image picked up by the camera 201.

In the above-described studio, if the walls, floors, and the like, other than the furniture which is not to be verified, are painted blue, it is possible to use the mask generated by the mask image generating unit 212 of the image synthesis and display apparatus by the chromakey technique to extract just the required portion from the real image, and to synthesize this extracted portion exclusively with the simulation image.

By doing this, because it is possible to insert real objects into a virtual image in a manner that appears natural to the user, the user is not bothered due to the synthesis, and can make verifications of the design of the interior elements such as furniture and wallpaper using an image that provides a high sense of presence.

Next, a driving simulator will be described as an example of another sensory simulation system.

Figure 5:
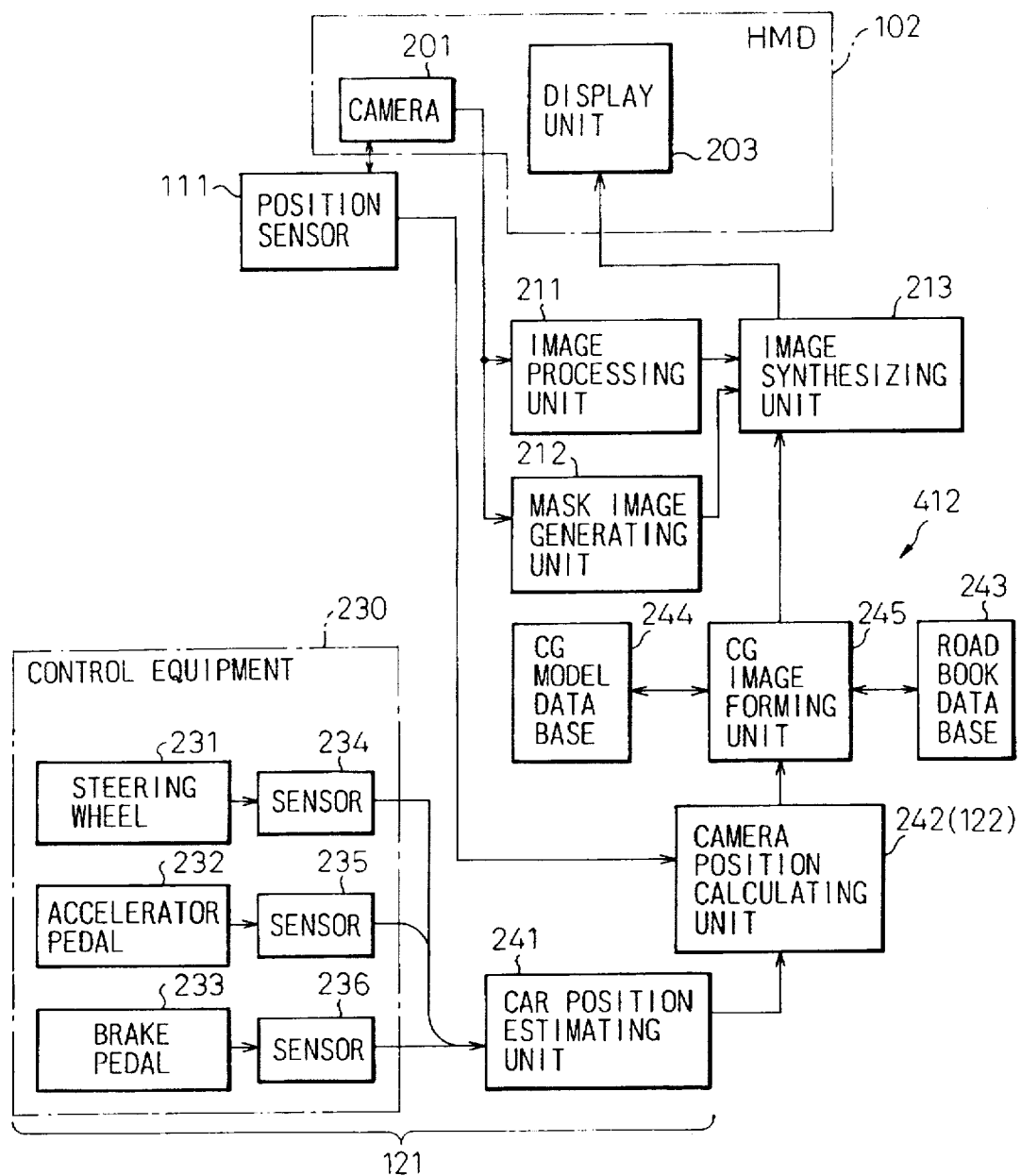
FIG. 5 is a block diagram which shows the constitution of an embodiment of a driving simulator to which the present invention has been applied.

FIG. 5 shows the configuration of a driving simulator to which the present invention has been applied.

In FIG. 5, the driving simulator is the image synthesis and display apparatus that is shown in FIG. 3, with the addition of a position sensor 111 and a simulation image forming unit 412 comprising control equipment 230, a car position estimating unit 241, a camera position calculating unit 242, a road book database 243, a computer graphics (CG) model database 244, and a computer graphics (CG) image forming unit 245.

In FIG. 5, the control equipment 230 has a steering wheel 231, an accelerator pedal 232, and a brake pedal 233, which the user directly operates. In the control equipment 230, a sensor 234 which is associated with the steering wheel 231 measures the turning angle $\phi(t)$ of the steering wheel 231 at the time t, and the sensors 235 and 236 which are associated with the accelerator and brake pedals, respectively, measure the amount of depression A(t) and B(t) of these pedals at the time t, these measurements being sent to the car position estimating unit 241.

The car position estimating unit 241, in the same manner as driving simulators of the past, estimates the position on the road occupied by the vehicle to be simulated, based on the operating quantities in the above-described control equipment 230.

Specifically, by means of the above-described control equipment 230 and the car position estimating unit 241, the function of the movement information forming means 121 is implemented, so that virtual movement information related to the movement of the car in the virtual space is formed.

In indicating the position of the car on the road, it is convenient to establish a coordinate system having the positive X-axis direction indicated as a direction of north on the map and up and down directions represented by the Z axis. This coordinate system will hereinafter be referred to as the road coordinate system.

For example, the car position estimating unit 241 first measures the velocity V(0) of car at time 0 and the amounts of depressions A(t) and B(t) of the accelerator pedal 232 and the brake pedal 233 at time t, these being substituted into Equation (1) below to determine the velocity V(t) of the car at time t.

$$V(t) = V(0) + \int_0^t (aA(t) - bB(t))dt \qquad (1)$$

In Equation (1), the constant a is a coefficient which associates the amount of depression of the accelerator pedal 232 with the positive acceleration imparted to the car, and the constant b is a coefficient which associates the amount of depression of the brake pedal 233 with the negative acceleration imparted to the car.

Next, the car position estimating unit 241 substitutes the velocity V(t), the angle θ(0) which is the orientation of the car relative to the X axis of the road coordinate system, and the turning angle φ(t) of the steering wheel 231 into the Equation (2) shown below to determine the angle θ(t) which is the traveling direction of the car at time t relative to the X axis of the road coordinate system.

$$\theta(t) = \theta(0) + \int_0^t \omega(\phi(t), V(t))dt \qquad (2)$$

In Equation (2), the function ω is a function which expresses the angular velocity of change of traveling direction of the car by using, as two arguments, the turning angle of the steering wheel 231 φ(t) and the velocity V(t).

Based on the velocity V(t) and traveling direction θ(t) calculated in the above-noted Equations (1) and (2) and on the initial position coordinates (X$_0$, Y$_0$, Z$_0$) of the care at time 0, the car position estimating unit 241 uses Equations (3) to (5) shown below to calculate the position coordinates (X(t), Y(t), Z(t)) at time t.

$$X(t) = X(0) + \int_0^t V(t)\cos(\theta(t))dt \qquad (3)$$

$$Y(t) = Y(0) + \int_0^t V(t)\sin(\theta(t))dt \qquad (4)$$

$$Z(t) = 0 \qquad (5)$$

By doing this, depending on operating amounts input via the control equipment 230, it is possible to determine the position of the car in the road map space, which is a virtual space.

Figure 6A:
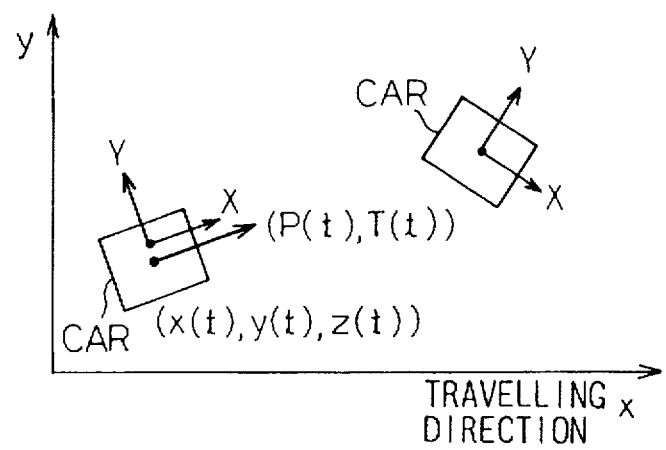
FIG. 6A and FIG. 6B are drawings which show the road map coordinate system and the internal vehicle coordinate system.

Because the position and light axis direction of the camera 201 which are obtained by the position sensor 111 are derived as the coordinates (x(t), y(t), z(t)) and the light axis direction (P(t)), T(t)) based on the car interior coordinate system, as shown in FIG. 6A, it is necessary to perform processing to convert this position and light axis direction to coordinates and a direction in the road map coordinate system.

Figure 6B:
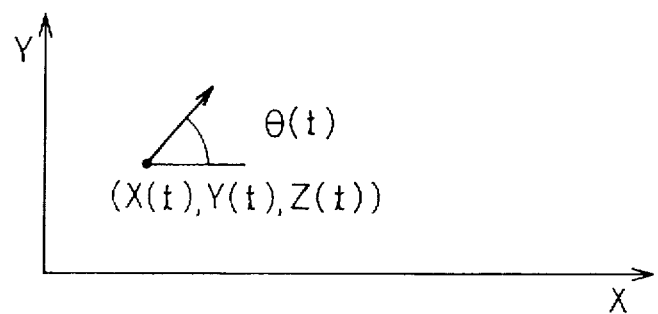

If the origin of the car interior coordinate system is taken as the center position of the car, this origin corresponds to the position of the car in the road map coordinate system. The X axis in this case corresponds to the front-back direction of the car, so that this corresponds to the traveling direction of the car in the road map coordinate system as shown in FIG. 6B.

Therefore, the camera position calculating unit 242 uses the Equations (6) to (10) shown below to calculate each component of the coordinates, at time t, (Xc(t), Yc(t), Zc(t)) which represent the position of the camera 201 in the road map coordinate system, and each component (Pc(t), Tc(t)) of the light axis direction in the road map coordinate system.

$$Xc(t) = X(t) + x(t)\cos(Pc(t)) \qquad (6)$$

$$Yc(t) = Y(t) + y(t)\sin(Pc(t)) \qquad (7)$$

$$Zc(t) = Z(t) \qquad (8)$$

$$Pc(t) = P(t) + \theta(t) \qquad (9)$$

$$Tc(t) = T(t) \qquad (10)$$

By doing this, based on each of the operating amounts which are input from the control equipment 230 and on the position of the camera 201 which is measured by the position sensor 111, it is possible to determine the position occupied by the camera 201 in the virtual road map coordinate system. Specifically, the car position estimating unit 242 implements the coordinate transforming means 122 which is shown in FIG. 2.

Because the camera 201 position and light axis direction obtained from the car position estimating unit 242 as described above approximate the position of the eyes of the user and the view orientation of the user inside the virtual car which is moving in the road map coordinate system, the computer graphics image forming unit 245 takes the coordinates (Xc(t), Yc(t) Zc(t)) obtained as the position of the camera 201 as the projection reference point, and takes the light axis direction (Pc(t), Tc(t)) of the camera 201 as the normal direction to the projection plane for the formation of the computer graphics.

In doing this, the road book database 243 has stored in it road information which indicates for positions in the road map coordinate system the direction of the road and the existence or non-existence of intersections at those positions, and the computer graphics model database 244 has stored in it not only computer graphics models of roads and surrounding views, but also computer graphics models of the interior and the outer shape of the car.

In this case, the computer graphics image forming unit 245 first, based on the above-described coordinates, searches the road book database 243, searching the computer graphics model database 244 for the computer graphics model indicated by the road information thus obtained, and forming computer graphics which represent the surroundings of the car. Next, the computer graphics image forming unit 245 searches the computer graphics model database 244 for the computer graphics model corresponding to the type of car and, based on the position and the light axis direction of the camera 201 in the car interior space, forms the computer graphics (CG) image which represents the interior and the outer shape of the car, and overwriting this CG image on the above-noted computer graphics image which represents the surroundings of the car.

In this manner, the computer graphics image forming unit 245 performs processing to form a computer graphics image based on the road book database 243 and the computer graphics model database 244, thereby enabling the implementation of the function of the computer graphics generating means 123.

The simulation images which represents the interior and the surroundings of the virtual car which are formed by the computer graphics image forming unit 245 are sent to the image synthesizing unit 213 of the image synthesis and display apparatus as externally input images.

If, for example, the above-noted control equipment 230, and the seat upon which the user sits, are located in a room which has had its interior painted blue, the mask image generating unit 212 of the image synthesis and display apparatus can use the chromakey technique to obtain a mask image which distinguishes the steering wheel 231, accelerator pedal 232, and brake pedal 233 of the control equipment 230 or the arms and legs or clothing of the user from the background portion of the image.

Therefore, based on this mask image, it is possible for the image synthesizing unit 213 to synthesize the above-described simulation image and the real image obtained by the camera 201, thereby exclusively inserting into the simulation image the parts of the real image representing the steering wheel 231 or arms or legs of the user.

In doing this, because a real image of the users hands holding the steering wheel, which is picked up in real time, can be inserted into the simulation image at the appropriate position within that simulation image, it is possible to display actually existing objects among the virtual objects of the simulation image with natural position relationships. By doing this, the user is not bothered by an unnaturally synthesized display, and can therefore concentrate on the driving simulation.

Because there is no need for preparing a model of the driver's seat or a screen, it is not only possible to improve the compactness of the driving simulator, but also possible to provide the user with a 360-degree field of view that achieves a high sense of presence.

By having a configuration that represents the inside of the car and the outer shape of the car in the form of computer graphics, it is possible to perform driving simulation for a variety of car models.

It is also possible to provide a model of the area surrounding the driver's seat and to use a real image picked up by the camera 201 as the image of the inside of the car. In this case, the processing burden on the computer graphics image forming unit 245 is lightened, since the need to perform processing to form the computer graphics image of the inside of the care is eliminated.

If this is done, if a window or the like is provided at the driver's seat, it is possible to perform a natural simulation of driving in the case of driving the car into a garage, for example.

In addition, if two image synthesis and display apparatuses according to the present invention (pickup means 103L and 103R and display means 101L and 101R) are provided, it is possible to use a stereo viewing technique to achieve a driving simulator with an enhanced sense of presence. It is also possible, in the above case, to have single extraction means 104 and synthesis means 105.

Figure 7:
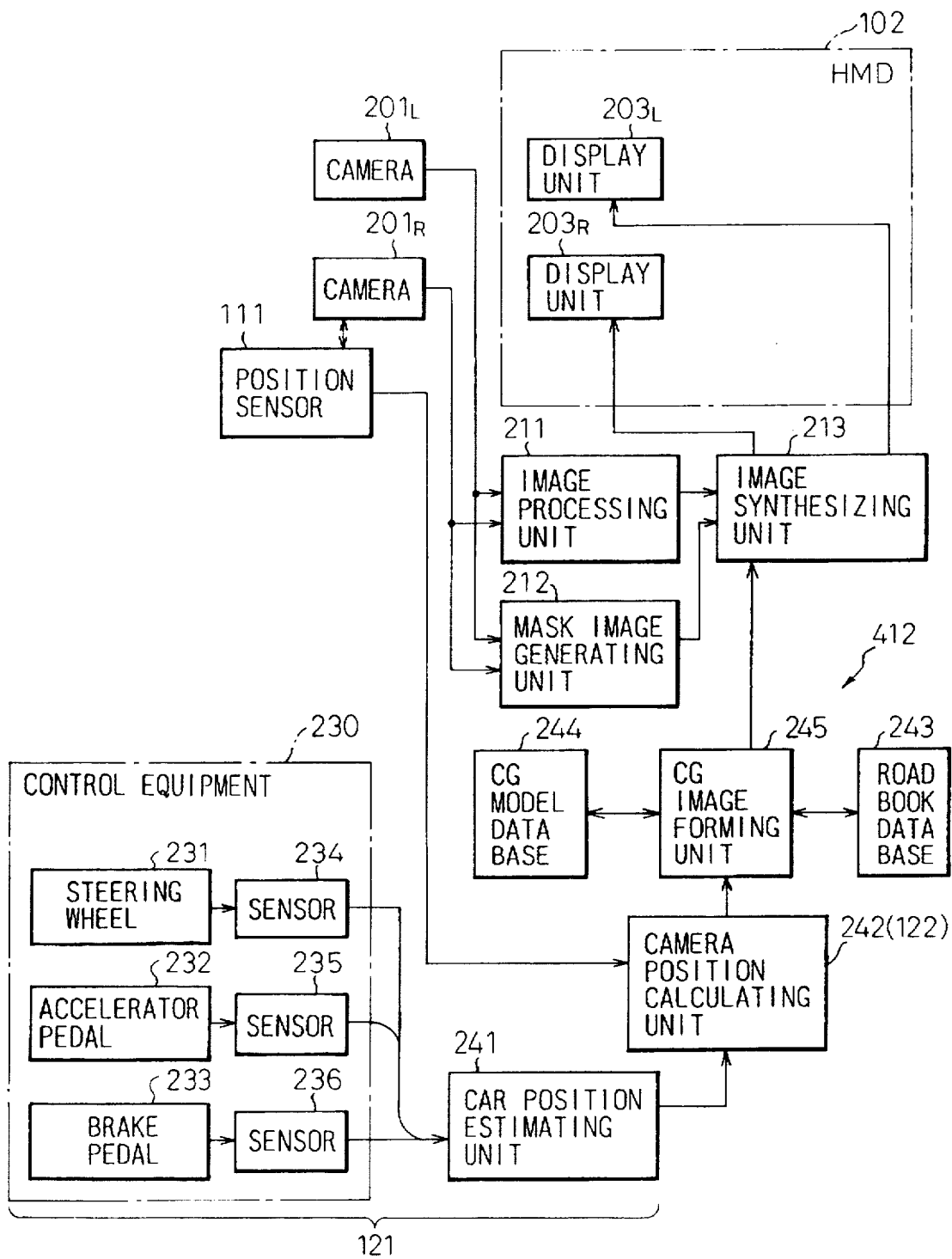
FIG. 7 is a block diagram which shows the constitution of an embodiment of a stereo-type driving simulator to which the present invention has been applied.

FIG. 7 shows the configuration of a stereo-type driving simulator embodiment to which the present invention is applied.

In FIG. 7, in order to display independent images to the left eye and the right eye of the user, the head-mounted display 102 has two display units 203L and 203R. These display units 203L and 203R correspond to the display devices 101L and 101R (131L and 131R), and are located immediately in front of the left eye and the right eye of the user, with their light axis directions aligned to the view orientation of the user.

The cameras 201L and 201R of the two image synthesis and display apparatuses L and R correspond to the image pickup elements 103L and 103R (132L and 132R), respectively, and are mutually separated outside the above-noted head-mounted display 102 by a distance D which corresponds to the distance between the left and right eyes of the user. The light axis directions of the cameras 201L and 201R are adjusted so as to coincide with the light axis directions of the above-noted display units 203L and 203R, respectively, and the respective angular fields of view are adjusted to coincide with the angular fields of view in the case when the left eye and the right eye of the user view the display units 203L and 203R.

By using the above-described positioning, the two cameras 201L and 201R can pick up images that exhibit binocular parallax corresponding to the parallax between the fields of view of the left eye and right eye of the user.

By operating the two left and right image processing units 211L and 211R, the two left and right mask image generating units 212L and 212R, and the two left and right image synthesizing units 213L and 213R of the left and right image synthesis and display apparatuses L and R, it is possible to extract an actual object as seen in each field of view, and to synthesize simulation images for each of the eyes independently. Note that, in FIG. 7, the image processing units 211L and 211R, the mask image generating units 212L and 212R, and the image synthesizing units 213L and 213R are shown as a single image processing unit 211, a mask image generating unit 212, and an image synthesizing unit 213, respectively. This is because the image processing unit 21 and the mask image generating unit 212 sequentially perform processing for the left side and the right side.

The processing to form the simulation images for the left and right eyes is described below.

For the purpose of the following explanation, the two cameras 201L and 201R are rigidly fixed to the head-mounted display 102, the viewing axis direction of the two cameras 201L and 201R are mutually parallel, and the relative positions of the two cameras are fixed.

Therefore, position sensor 111 measures, for example, the position and the light axis direction of the camera 201R corresponding to the right eye in the car interior coordinate system, the camera position calculating unit 242 then calculating the positions and the light axis directions of the two cameras 201L and 201R in the road coordinate system, based on the results of the above-noted measurement.

In doing this, the camera position calculating unit 242 first substitutes the position $(x_R(t), y_R(t), z_R(t))$ and light axis direction $(P_R(t), T_R(t))$ of camera 201R at time t and the distance D between the eyes into the Equations (1) through (15) given below to calculate the position $(x_L(t), y_L(t), z_L(t))$ and light axis direction $(P_L(t), T_L(t))$ at time t.

$$x_L(t) = X_R(t) - D \cdot \sin(P_R(t)) \quad (11)$$

$$y_L(t) = y_R(t) - D \cdot \cos(P_R(t)) \quad (12)$$

$$z_L(t) = z_R(t) \quad (13)$$

$$P_L(t) = P_R(t) \quad (14)$$

$$T_L(t) = T_R(t) \quad (15)$$

Next, the camera position calculating unit 242 can use the previously presented Equations (1) through (5) to convert the positions and light axis directions of the two cameras 201L and 201R to the road map coordinate system. By doing this, the coordinates $(X_{LC}(t), Y_{LC}(t), Z_{LC}(t))$ representing the position and light axis direction $(P_{LC}(t), T_{LC}(t))$ of the camera 201L in the road map coordinate system and the coordinates $(X_{RC}(t), Y_{RC}(t), Z_{RC}(t))$ representing the position and light axis direction ($P_{RC}(t)$, $T_{RC}(t)$) of the camera 201R are obtained.

In doing this, the computer graphics image forming unit 245, as was the case for the above-described driving simulator, takes the coordinates ($X_{LC}(t)$, $y_{LC}(t)$, $z_{LC}(t)$) as the projection reference point, and takes the light axis direction ($P_{LC}(t)$, $t_{LC}(t)$) as the normal direction to the picture plane for simulating the image for the left eye, and takes the coordinates ($X_{RC}(t)$, $Y_{RC}(t)$, $Z_{RC}(t)$) as the projection reference point, and takes the light axis direction ($P_{RC}(t)$, $T_{RC}(t)$) as the normal direction to the picture plane for simulating the image for the right eye.

The simulation images for the left eye and for the right eye obtained as described above have a parallax that is equivalent to the parallax between the two cameras 201L and 202R. Therefore, it is possible for the image synthesizing units 213L and 213R for the left and right image synthesis and display apparatuses L and R to synthesize the above two simulation images with actual images picked up by the cameras 201L and 201R, and to display these synthesized images independently on the display units 203L and 203R of the head-mounted display 102, thereby achieving a 3-dimensional stereoscopic effect.

By doing this, it is possible to employ 3-dimensional stereo viewing techniques to present to the user a view with a feeling of depth, thereby enabling the achievement of more natural driving simulation environment.

It is also possible to use the stereoscopic effect in the same manner to implement a stereo-type interior simulator.

Figure 8:
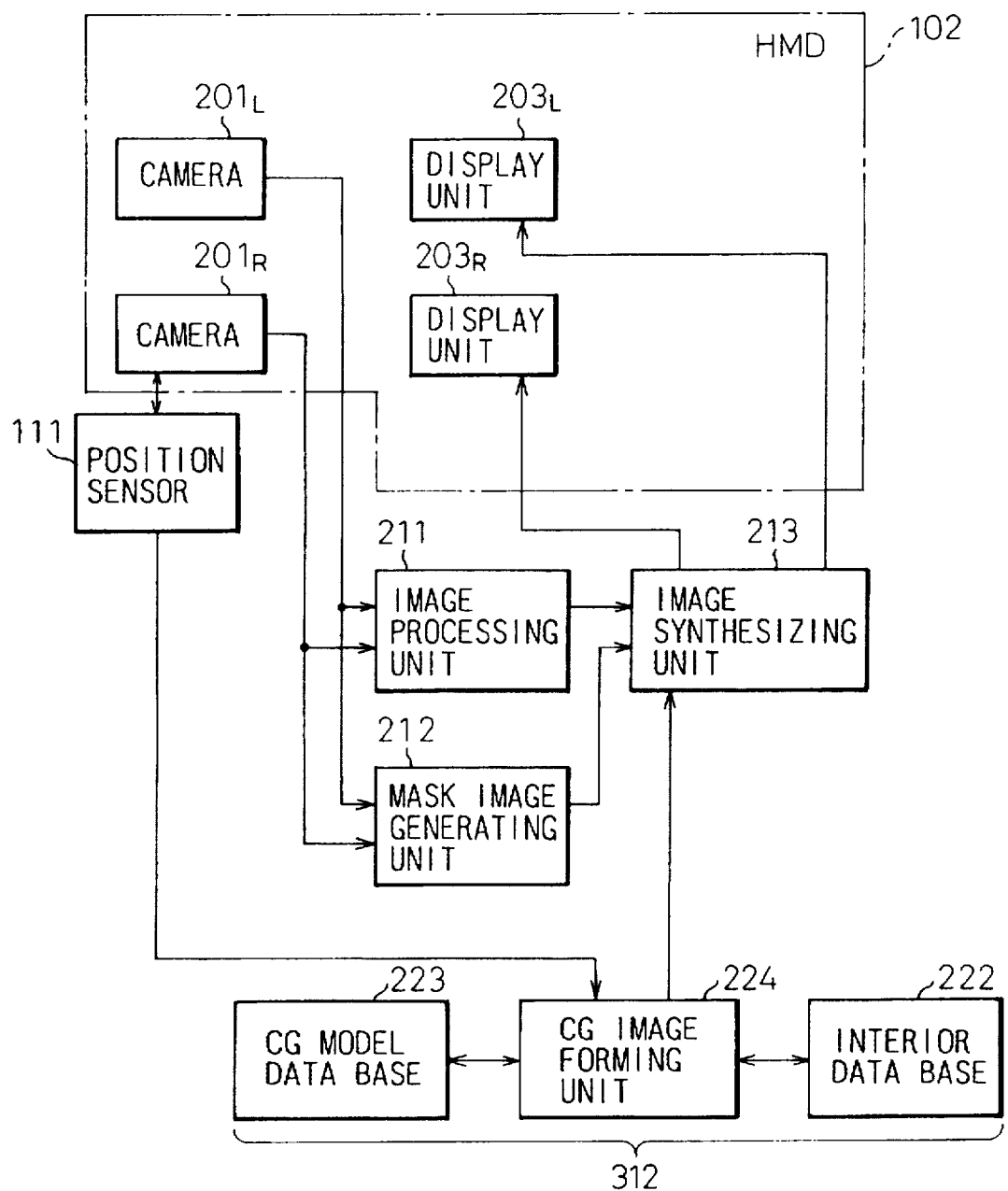
FIG. 8 is a block diagram which shows the constitution of an embodiment of an interior simulator to which the present invention has been applied.

FIG. 8 shows the configuration of an embodiment of a stereo-type interior simulator to which the present invention has been applied.

In the interior simulator shown in FIG. 8, the cameras 201L and 201R and display units 203L and 203R of the head-mounted display 102 are positioned the same as in the case of the above-described driving simulator, these two cameras 201L and 201R are configured to pick up images that have the same parallax as the binocular parallax of the user's eyes.

units 211L and 212R with the each of the simulation images, thereby exclusively inserting, into each of the images picked up by the cameras 201L and 201R, the portions of image for the required objects which are to be positioned in this part, and the results of the two synthesizing operations are independently displayed on the display units 203L and 203R of the head-mounted display 102.

Because the above two simulation images and the images obtained by the cameras 201L and 201R have a parallax between the two cameras 201L and 202R that is equivalent to the parallax sensed by the two eyes of the user, by synthesizing and displaying these image independently, it is possible to obtain a synthesized image that is extremely close to the image that would be seen directly by the user through both eyes.

In case of an interior simulator in particular, because the object of interest is often close, making the binocular parallax is large, by implementing a stereo effect as described above, compared with a flat synthesized display, the user is afforded a greatly enhanced feeling of presence.

FIG. 9 is a block diagram which shows a mask image generating unit 212, and it is possible to implement the extraction means 104, which is an essential element of the present invention, in the form of, for example, this mask image generating unit 212.

In the mask image generating unit 212, a color data converting unit 251 sequentially reads in the RGB pixels of the input image, and converts these to $\alpha$, $\beta$, and $\gamma$ color data which represent the brightness, saturation, and hue of each of the pixels. If the pixel color values of the input image are R, G and B (where $0.0 \leq R \leq 1.0$, $0.0 \leq G \leq 1.0$, and $0.0 \leq B \leq 1.0$) of the input image, the $\alpha$, $\beta$, and $\gamma$ values are calculated by the following equations.

$$\alpha = 0.31 \times R + 0.60 \times G + 0.29 \times B \quad (0.0 \leq \alpha \leq 1.0)$$

$$\beta = \cos^{-1}\left[\frac{R+G+B}{\{3 \times (R^2 + G^2 + B^2)\}^{1/2}}\right] \quad (0.0 \leq \beta \leq \pi/3)$$

$$\gamma = \begin{bmatrix} \pi + \theta & (G \geq B) \\ \pi - \theta & (G < B) \end{bmatrix} \quad (0.0 \leq \gamma \leq 2\pi)$$

$$\theta = \cos^{-1}\left[\frac{(2R - G - B)/(R+G+B)}{\left[6 \times \left\{\left(\frac{R}{R+G+B} - \frac{1}{3}\right)^2 + \left(\frac{G}{R+G+B} - \frac{1}{3}\right)^2 + \left(\frac{B}{R+G+B} - \frac{1}{3}\right)^2\right\}^2\right]^{1/2}}\right]$$

The position sensor 111 measures the position and light axis direction of the above-noted 201R, and sends these to the computer graphics (CG) image forming unit 224. The computer graphics image forming unit 224 receives the inputs related to the position and light axis direction of the camera 201R, and then uses the above-noted equations (11) through (15) to determine the position and light axis direction of the camera 201L and also to form the simulation images corresponding to the left and right eyes, based on the positions and light axes of the two cameras 201L and 201R, these images being sent to the image synthesizing unit 213 of the image synthesis and display apparatus.

In response to this, the image synthesizing units 213L and 213R of the left and right parts of the image synthesis and display apparatus operate to perform, based on the mask image obtained from the mask image generating units 212L and 212R, synthesis of the outputs of the image processing The color data comparing unit 252 distinguishes the colors based on the values of $\alpha$, $\beta$, and $\gamma$, and outputs "0" if the color is the target color (blue in this case), or "1" if the color is another color. In the case in which the target color is blue, zero will be output if the input values of $\alpha$, $\beta$, and $\gamma$ satisfy the following conditions.

$0.1 \leq \alpha \leq 0.9$ $0.262 \leq \beta \leq 0.963$ $2.007 \leq \gamma \leq 2.967$ The output of the color data comparing unit 252 creates a mask image which is composed of data of a value "0" for the part of the input image that is blue (the target color) and "1" for other parts.

Figure 10A:
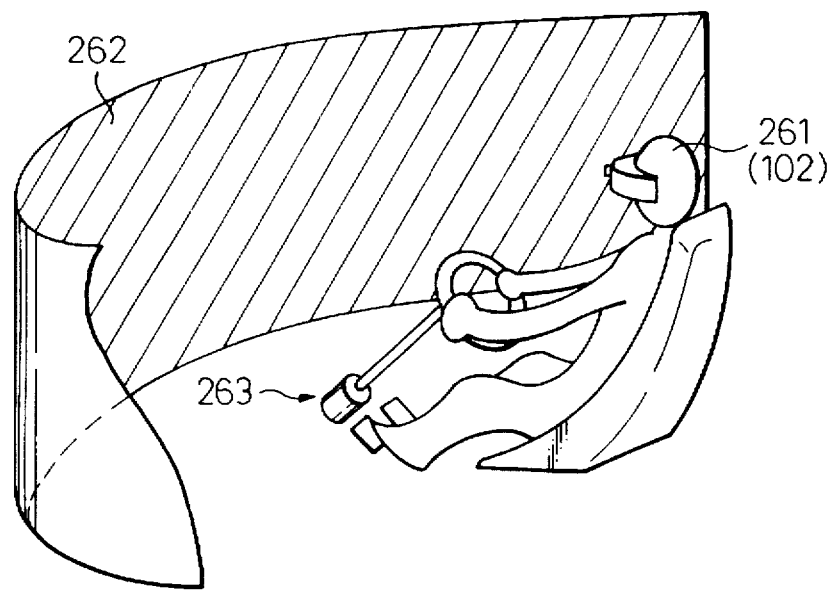
FIGS. 10A, 10B, 10C, 10D, and 10E are drawings which illustrate, by example, the image synthesis process in a driving simulation according to the present invention.
Figure 10B:
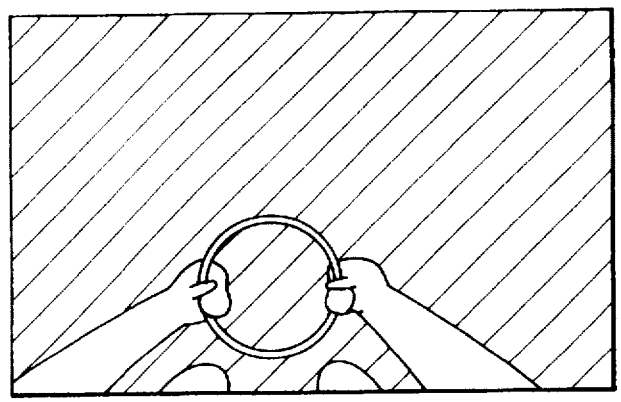
Figure 10C:
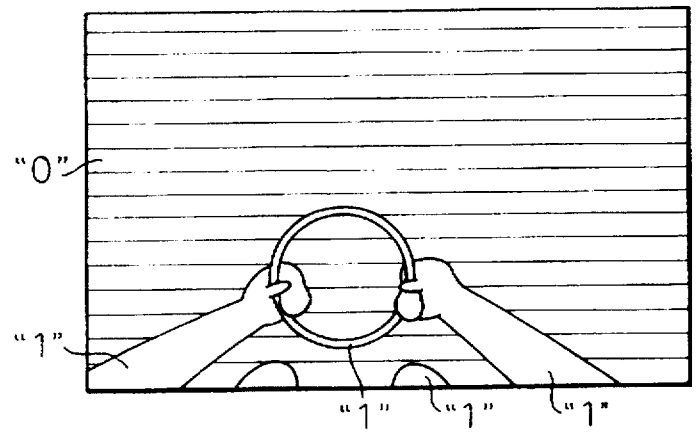

FIGS. 10A through 10E illustrate the process of image synthesis, based on the present invention, for the example of a driving simulator. Of these drawings, FIG. 10C is a convenient one to use to illustrate the outputs of "1" and "0" from the mask image generating unit 212 of FIG. 9 which is described above. The "1" and "0" outputs of FIG. 9 correspond to the "1" and "0" portions of FIG. 10C, with the "1" output being assigned to the part of the image representing the actual seen objects, such as the drivers hands, legs, and the steering wheel of the car, these parts only being extracted, with all other parts ("0" parts) remaining as the mask image parts. Into these parts is inserted at a later stage the simulation image, thereby creating the synthesized image (output image).

Starting at the beginning, FIG. 10A shows a perspective view of the driving simulator, in which the symbol 261 represents a head-mounted display having a camera. This corresponds to the head-mounted display 102 described before.

The driver operates the control equipment 263 (steering wheel, brake pedal, and accelerator pedal) of an actual car.

In front of the driver a blue-backdrop horizontal screen 262 is positioned.

The input image (left side of FIG. 9) picked up by the camera (previously described camera 201) inside the head-mounted display 261 is as shown in FIG. 10B. In this drawing, the diagonally hatched part represents the blue part of the horizontal screen that is picked up.

The input image shown in FIG. 10B has applied to it the processing of the mask image generating unit 212 shown in FIG. 9, thus becoming the mask image data (pattern of "1" and "0") shown in FIG. 10C as described above.

Figure 10D:
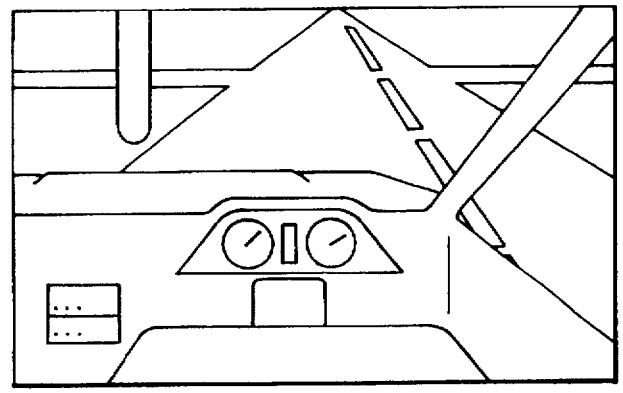
Figure 10E:
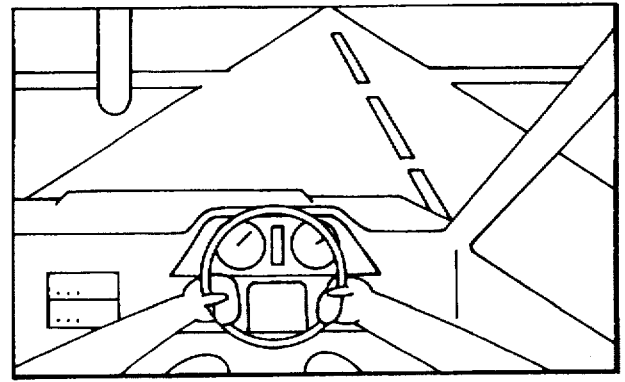

The scene shown in FIG. 10D is provided as the simulation image. This scene of FIG. 10D and the mask pattern of FIG. 10C are overlaid in the image synthesizing unit 213. By doing this overlaying, of the scene shown in FIG. 10D, the parts corresponding to locations at which the pattern has a value of "1" will remain as is, and the part that has a value of "0" will be entered as the scene shown in FIG. 10D.

In this manner the synthesized image of FIG. 10D is derived.

Whereas in the past a half-mirror was used to present a direct view to the user, in the present invention the scene is viewed through the camera 201, the image input from the camera being processed as an image to overlay onto a simulation image.

In an image synthesis and display apparatus of the present invention as described above, by virtue of the relative positioning of the image pickup means and the display means, it is possible to pick up and display a real image corresponding to the field of view of the user, and by extracting part of this real image and synthesizing this part exclusively with a simulation image which represents a virtual reality, it is possible to perform synthesis to insert real objects into a simulation image in the positions which they should occupy in the simulation image. By doing this, it is possible to provide the user with the impression that the real objects actually exist within the virtual space represented by the simulation image.

By applying the image synthesis and display apparatus of the present invention to an interior simulator, a driving simulator, or the like, and synthesizing the simulation image with the image picked up by the image pickup means in response to the position of the user, it is possible to provide to the user a synthesized image which appears natural, allowing the user to concentrate on the simulation, by virtue of a simulation which provides the user with an enhanced feeling of presence.

Furthermore, by positioning the image pickup means and display units for two sets of image synthesis and display apparatuses, for the left and right, so as to establish the distance between them to correspond to the eye-to-eye distance in the user, it is possible to independently pickup and display images which have a parallax equivalent to the binocular parallax of the user's left and right eyes, thereby independently displaying a synthesized image which includes the images corresponding to the left and right eyes of the user. By utilizing this relationship, it is possible to employ stereoscopic techniques to provide the user with a synthesized image with an enhanced feeling of presence, thereby providing the user with an improved simulation environment.

We claim:

1. An image synthesis and display apparatus comprising:

image pickup means for picking up an image of a range of an actual space corresponding to a field of view presented to a user by a display;

extraction means for extracting an image from the image picked up by said pickup means, the extracted image representing a specified object;

synthesis means for inserting the image extracted by said extraction means into a simulation image of an exclusively virtual space, and for providing the simulation image with the inserted image to the display for displaying to the user;

a position sensor which measures a position and light axis direction of said image pickup means in a real space; and a simulation image forming means which forms a simulated image which represents an object in the virtual space, based on a position and light axis direction in the virtual space corresponding to the position and light axis direction measured by said position sensor, wherein said simulation image forming means comprises movement information forming means for forming virtual movement information related to movement of a virtual position of the user in the virtual space, coordinate transforming means for transforming the position and light axis direction measured by said position sensor to a position and light axis direction in the virtual space, based on said virtual movement information, and computer graphic image generating means for generating computer graphics having a projection reference point and normal direction to a picture plane, in accordance with the position and light axis direction in the virtual space.

2. An image synthesis and display apparatus as set forth in claim 1, wherein said extraction means comprises a mask image forming unit which forms a mask image from the image picked up by said image pickup means.

3. An image synthesis and display apparatus as set forth in claim 2, further comprising an image processing unit which performs gradation processing with respect to the image picked up by said image pickup means, to produce a gradation processed image, wherein synthesis is performed on the gradation processed image of said image processing unit with the mask image from said mask image forming unit.

4. An image synthesis and display apparatus as set forth in claim 2, wherein said mask image forming unit comprising:

a color data converting unit which reads in the pixel color values of the image picked up by said image pickup means and converts said color values to color data which represents the brightness, saturation, and hue and a color data comparing unit which compares said color data with pre-established color conditions, and which, when said color data satisfy said color conditions, outputs a respective logic value of first and second logic values, and which, when the color is any other color, outputs the other of said first and second logic values, to thereby produce a mask image in the form of a pattern of the first and second logic values.

5. An image synthesis and display apparatus comprising:

image pickup means for picking up an image of a range of an actual space corresponding to a field of view presented to a user by a display;

extraction means for extracting an image from the image picked up by said pickup means, the extracted image representing a specified object;

synthesis means for inserting the image extracted by said extraction means into a simulation image of an exclusively virtual space, and for providing the simulation image with the inserted image to the display for displaying to the user;

a position sensor which measures a position and light axis direction of said image pickup means in a real space; and a simulation image forming means which forms a simulated image which represents an object in the virtual space, based on a position and light axis direction in the virtual space corresponding to the position and light axis direction measured by said position sensor, wherein said display comprises first and second display devices which independently display images to the left eye and the right eye, respectively, of the user, said image pickup means comprises first and second image pickup devices which pick up a range of a real space corresponding to the field of view presented to the user, said extraction means being configured so as to perform independent extraction processing with respect to the individual images obtained by said first and second image pickup devices, said simulation image forming means forms simulated images corresponding to the left eye and the right eye of the user, respectively, based on position and view orientation of the left eye and right eye, respectively, in the virtual space, in accordance with the position and light axis direction measured by said position sensor, and said synthesis means synthesizes simulation images corresponding to the left eye and right eye, respectively, with a result of extraction with respect to images obtained by said first and second image pickup devices, synthesis being performed independently for the left and right.

6. An image synthesis and display apparatus as set forth in claim 5, wherein said extraction means comprises a mask image forming unit which forms a mask image from the image picked up by said image pickup means.

7. An image synthesis and display apparatus as set forth in claim 6, further comprising an image processing unit which performs gradation processing with respect to the image picked up by said image pickup means, to produce a gradation processed image, wherein synthesis is performed on the gradation processed image of said image processing unit with the mask image from said mask image forming unit.

8. An image synthesis and display apparatus as set forth in claim 6, wherein said mask image forming unit comprising:

a color data converting unit which reads in the pixel color values of the image picked up by said image pickup means and converts said color values to color data which represents the brightness, saturation, and hue and a color data comparing unit which compares said color data with pre-established color conditions, and which, when said color data satisfy said color conditions, outputs a respective logic value of first and second logic values, and which, when the color is any other color, outputs the other of said first and second logic values, to thereby produce a mask image in the form of a pattern of the first and second logic values.

9. An apparatus comprising:

a display device which displays a simulation image to a user, the display device providing a field of view of the simulation image to the user;

an image pickup device which detects an image of a range of an actual space corresponding to the field of view provided to the user by the display device, the detected image including an image of an object;

an extraction unit which extracts the image of the object from the image detected by the image pickup device;

a synthesis unit which inserts the image extracted by the extraction unit into a simulation of a virtual space, to produce the simulation image displayed by the display device;

a position sensor which measures a position and a light axis direction in real space of the image pickup device; and a simulation image forming unit which forms a simulated image representing an object in the virtual space, based on a position and a light axis direction in the virtual space corresponding to the position and light axis direction measured by the position sensor, wherein the display device comprises first and second display devices which independently display images to the left eye and the right eye, respectively, of the user, the image pickup device comprises first and second image pickup devices which detect first and second images, respectively, the first and second images each being an image of a range of an actual space corresponding to the field of view presented to the user, the first and second images each including an image of the object, the extraction unit extracts the image of the object from the first and second images of the first and second image pickup devices, the simulation image forming unit forms simulated images corresponding to the left eye and the right eye of the user, respectively, based on position and view orientation of the left eye and right eye, respectively, in the virtual space, in accordance with the position and light axis direction measured by the position sensor, and the synthesis unit inserts the image of the object extracted by the extraction unit from the first image into a simulation image corresponding to the left eye of the user, and inserts the image of the object extracted by the extraction unit from the second image into a simulation image corresponding to the right eye of the user, to produce the simulation image displayed to the user by the display device.

10. An apparatus as set forth in claim 9, wherein the extraction unit comprises a mask image forming unit which forms a mask image from the image detected by the image pickup device.

11. An apparatus as set forth in claim 10, further comprising an image processing unit which performs gradation processing with respect to the image detected by the image pickup device, to produce a gradation processed image, wherein synthesis is performed on the gradation processed image of the image processing unit with the mask image formed by the mask image forming unit.

12. An apparatus as set forth in claim 10, wherein the mask image forming unit comprises:

a color data converting unit which reads in pixel color values of the image detected up by the image pickup device and converts the color values to color data representing brightness, saturation, and hue and a color data comparing unit which compares the color data with pre-established color conditions, and which, when the color data satisfy the color conditions, outputs a respective logic value of first and second logic values, and which, when the color data does not satisfy the color conditions, outputs the other of the first and second logic values, to produce a mask image in the form of a pattern of the first and second logic values.

13. An apparatus as set forth in claim 9, wherein the image pickup device is aligned with the display device, and the image pickup device and the display device move with the user while maintaining the alignment between the image pickup device and the display device.

* * * * *